United States Patent
Garrett et al.

(10) Patent No.: US 6,272,564 B1
(45) Date of Patent: Aug. 7, 2001

(54) EFFICIENT DATA TRANSFER MECHANISM FOR INPUT/OUTPUT DEVICES

(75) Inventors: Henry Michael Garrett, Raleigh; William G. Holland, Cary; Joseph Franklin Logan; Joseph Gerald McDonald, both of Raleigh; John Kenneth Stacy, Cary, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/420,699

(22) Filed: Oct. 19, 1999

Related U.S. Application Data

(62) Division of application No. 08/847,034, filed on May 1, 1997, now Pat. No. 6,049,842.

(51) Int. Cl.[7] .............................. G06F 13/38; G06F 13/28
(52) U.S. Cl. ................................. 710/33; 710/22
(58) Field of Search .............................. 709/212; 710/19, 710/22–24, 33–35

(56) References Cited

U.S. PATENT DOCUMENTS

| | | | |
|---|---|---|---|
| 4,783,730 | * 11/1988 | Fischer | 710/5 |
| 5,448,702 | * 9/1995 | Garcia, Jr. et al. | 710/100 |
| 5,488,724 | * 1/1996 | Firoozmand | 709/212 |
| 5,781,749 | * 7/1998 | Quere | 710/129 |
| 5,828,901 | 10/1998 | O'Toole et al. | 395/842 |
| 5,870,627 | 9/1999 | O'Toole et al. | 395/842 |

* cited by examiner

Primary Examiner—Thomas Lee
Assistant Examiner—Ilwoo Park
(74) Attorney, Agent, or Firm—Joscelyn G. Cockburn

(57) ABSTRACT

A method for transferring data between non-contiguous buffers in a memory and an I/O device via a system I/O bus uses a descriptor queue stored in memory. Each descriptor points to a buffer and includes the length of the buffer. The I/O device is provided with the base address of the queue, the length of the queue and a current address which at initialization is the same as the base address. When data is to be transferred a device driver located in the processor sends the number of available descriptors (DescrEnq) to the I/O device which accesses the descriptors individually or in burst mode to gain access to the data buffers identified by the descriptors.

4 Claims, 4 Drawing Sheets

EFFICIENT DATA TRANSFER MECHANISM FOR INPUT/OUTPUT DEVICES

CROSS REFERENCES TO RELATED PARENT APPLICATION

This patent application is a Divisional of patent application Ser. No. 08/847,034, filed May 1, 1997, U.S. Pat. No. 6,049,842.

BACKGROUND

Field of the Invention

Advances in the design and fabrication of microprocessors in the past few years have resulted in a dramatic increase in processor speeds. In fact average speeds have increased more than four fold in the last decade alone. At the same time peripheral input/output busses have remained substantially constant. For example, the Industry Standard Architecture (ISA) bus operates at 8 MHz while many microprocessors operate in the 100–200 MHz range.

As the discrepancy in speed increases, it has become unfeasible to directly connect the I/O bus to the microprocessor. PC developers have solved this problem by providing "bridge modules" which disconnect the microprocessor/memory from the I/O bus. While this greatly improves the performance of the microprocessor when it is working from memory or cache, it typically does so at the expense of the microprocessor I/O bus interface. In the current PC environment it is typical for a microprocessor to wait 100 or more processor cycles for each I/O bus access.

Under these conditions the amount of time the microprocessor spends handling devices attached to the I/O bus can significantly impact the microprocessor's performance. Many high speed peripheral devices, such as disk drives and network controllers, are designed to be bus masters which allows these devices direct memory access (DMA). This removes the burden of data movement to the peripheral from the microprocessor resulting in an improvement in the utilization of the microprocessor bandwidth. However, microprocessor communication with peripheral devices still remains a major area for improvement.

A critical factor in the performance of today's computer systems is "I/O throughput". This refers to the ability of a computer system to quickly and efficiently move data between main memory and I/O devices.

FIG. 1 illustrates an environment in which the invention operates. High performance I/O devices generally operate as masters on the system bus for moving data from and to main a memory. As bus masters, the I/O devices arbitrate for use of the system bus and directly write data to and read data from main memory. Operation of the I/O device is controlled by "device driver" software executing on the computer's main processor. The device driver monitors and controls the I/O devices by reading and writing their I/O registers across the system bus.

Improved I/O throughput can be achieved by making efficient use of the system bus. Improvements in efficiency appear possible in three areas:

1. reduce the number of register I/O write and read operations;
2. reduce I/O device data transfer overhead such as headers and control blocks; and,
3. utilize burst mode transfer capabilities.

SUMMARY OF THE INVENTION

The invention contemplates a method for transferring data between non-contiguous buffers in the memory and an I/O device. The driver defines a descriptor queue (DQ) in the memory having a base address (DescrBase) and an n descriptor capacity (DescrCount). At initialization the DescrBase, the DescrCount and a third value DescrCurrent, which at initialization equals the value of the DescrBase, are stored in the I/O device. The driver builds one or more descriptors in the DQ, each corresponding to a different one of the data buffers queued for transfer to the I/O device, the descriptors include at least the starting address of the buffer and a byte count. The number of descriptors built is stored in an enqueue (DescrEnq) register in the I/O device.

The I/O device examines the DescrEnq value for a non-zero condition and fetches a number of descriptors from the DQ corresponding to the DescrEnq value starting at the address specified by the DescrCurrent value and increments the DescrCurrent value and decrements the DescrEnq value each time a descriptor is fetched. The descriptors are used to read the memory and transfer the data read across the system bus for transmission.

DETAILED DESCRIPTION OF THE INVENTION

Figure 1:
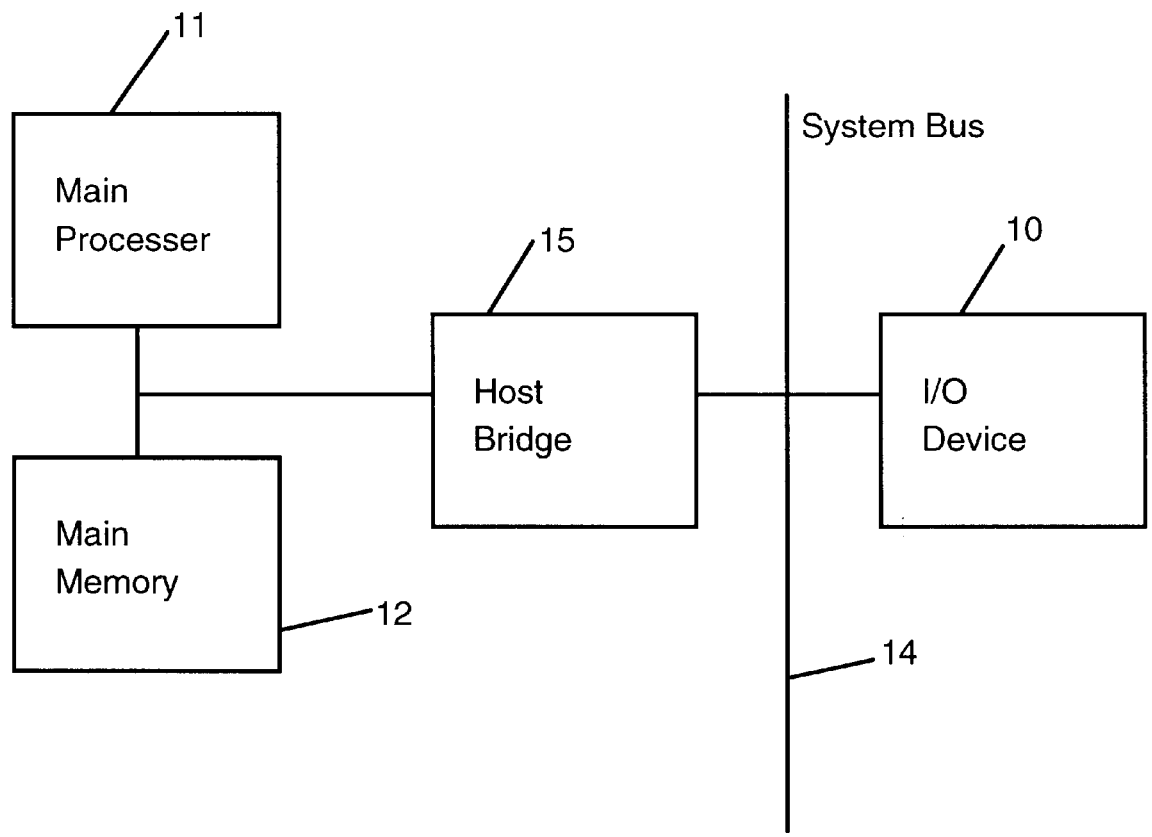
FIG. 1 is a block diagram of a system environment in which the invention operates.

In FIG. 1 an I/O device 10 is connected to a main processor 11 and main memory 12 by a system bus 14 and a host bridge 15. The system bus may employ any one of a number of standard architectures such as PCI, ISA, etc. and the host bridge logic can use an Intel 430FX or similar devices provided by other manufacturers.

Figure 2:
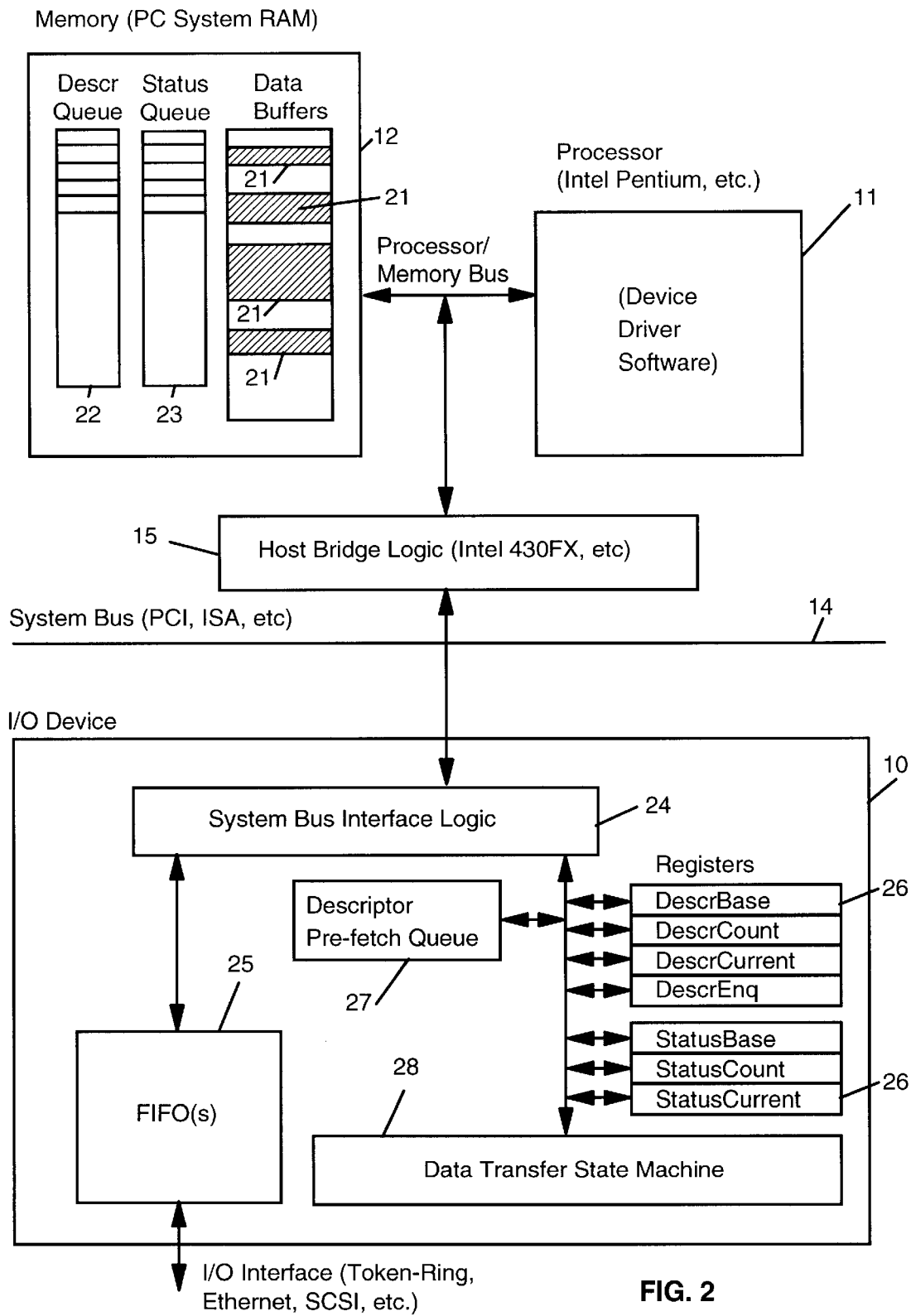
FIG. 2 is a block diagram illustrating in detail the internal structure of the devices illustrated in FIG. 1.

FIG. 2 illustrates elements within I/O device 10, processor 11 and memory 12 which are unique to the invention or interact with the unique elements.

Figure 3:
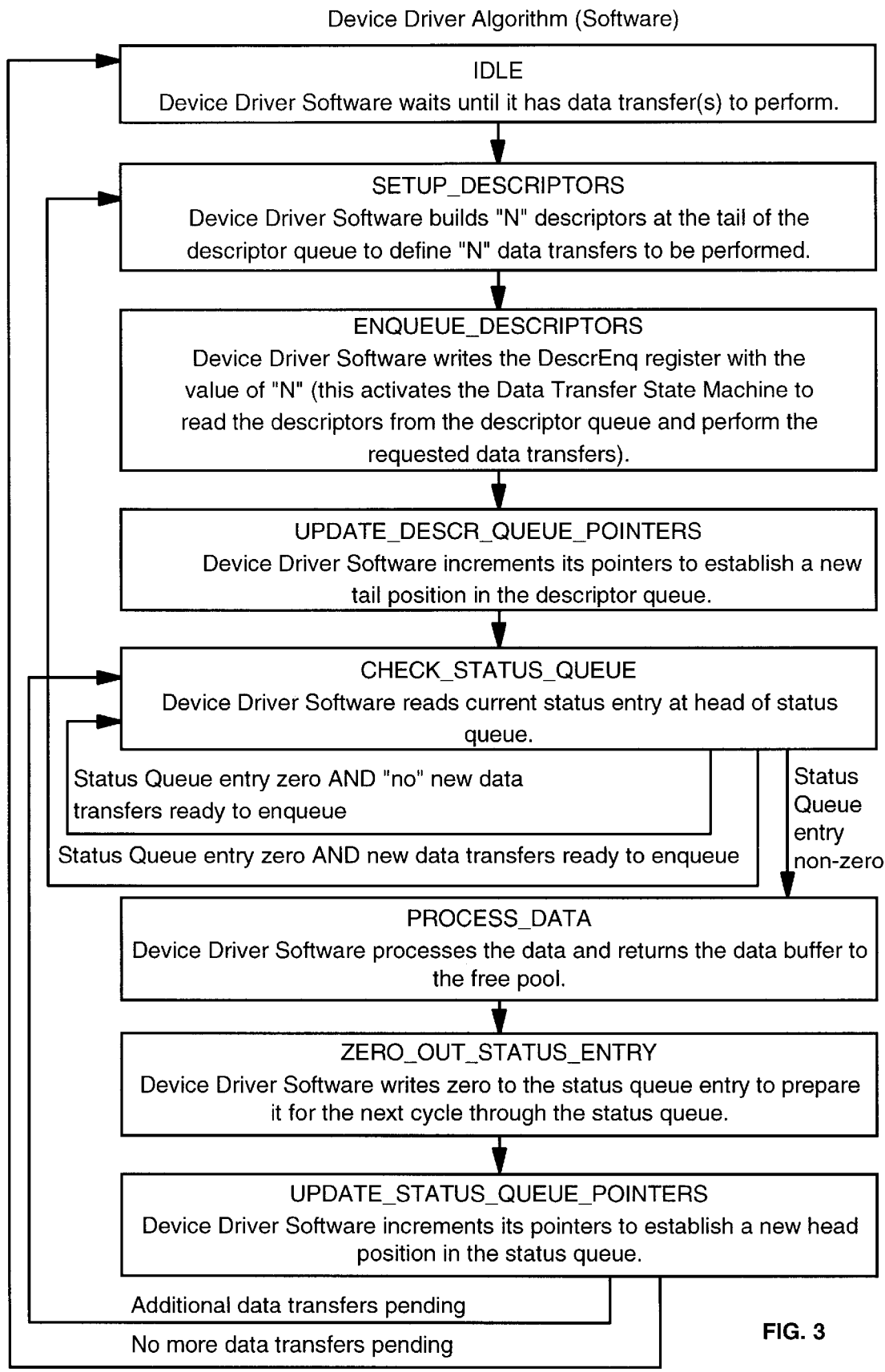
FIG. 3 is an illustration of the device driver algorithm running on the processor illustrated in FIGS. 1 and 2.

Device driver software runs on the processor 11 (FIG. 3 is a flow diagram of the software). The memory 12 includes a number of data buffers 21 of varying size scattered throughout the memory. These buffers are used for storing data which is to be transferred to/from the I/O device. Typically, the I/O device could be a communications adapter for connecting the processor and its application programs to a communication network such as Token Ring, Ethernet, etc. and transmitting data generated and stored in the memory via the network. In addition to the data buffers, the memory includes a descriptor queue (Descr Queue) 22 and a status queue (Status Queue) 23.

The I/O device 10 includes system bus interface logic 24 which will conform to the specific requirements of the standard bus architecture selected for the application. A FIFO interface 25 which conforms to the specific requirements of the particular communication network selected for the application.

Figure 4:
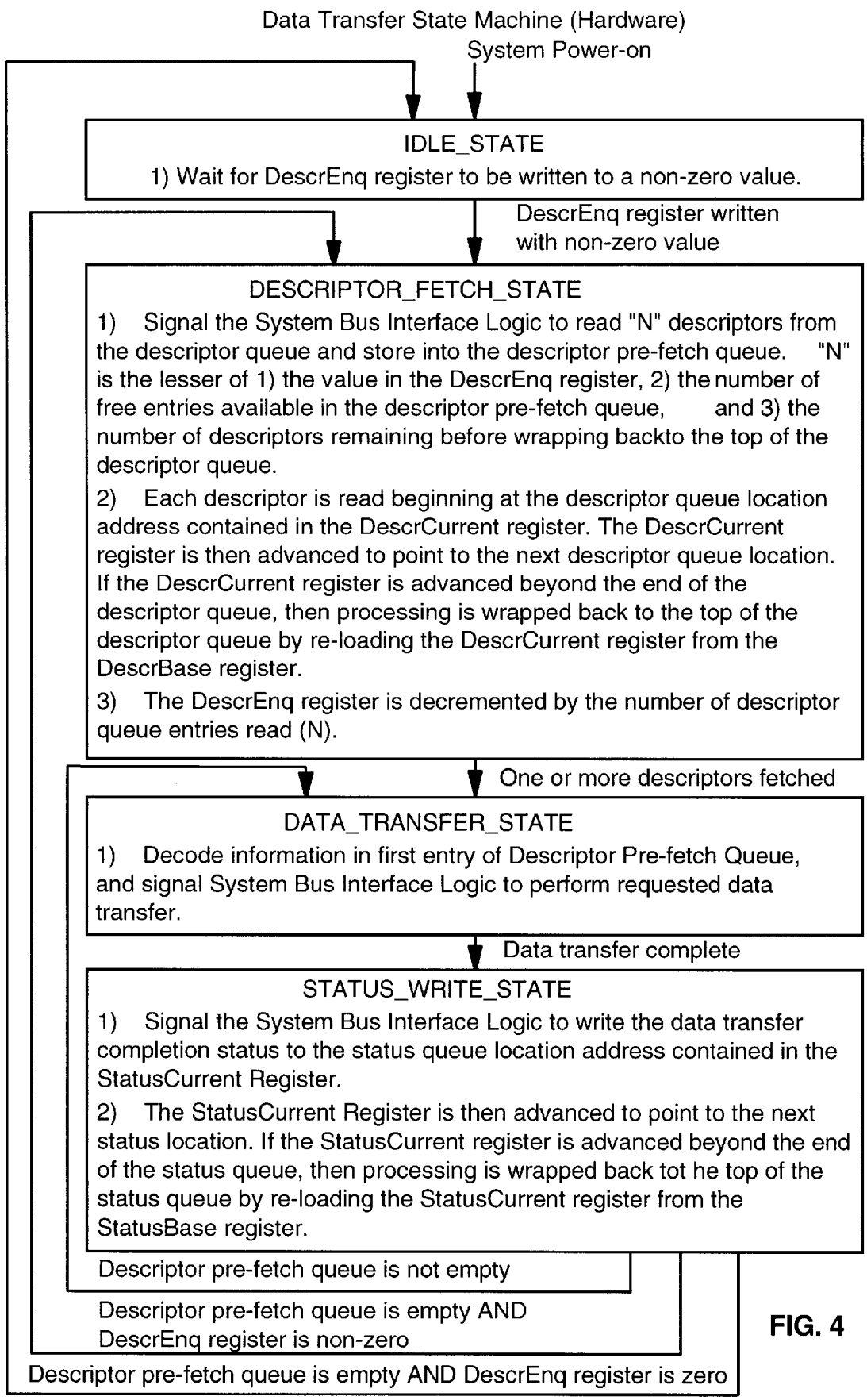
FIG. 4 is an illustration of the data transfer state machine resident in the I/O device illustrated in FIGS. 1 and 2.

In addition the I/O device 10 includes a plurality (7) of registers 26 for storing information relative to the two queues 22 and 23 in the memory 12. The contents of these registers will be described in detail below. It also includes a storage area 27 for storing descriptors transferred from the queue 22 by a data transfer state machine 28 (FIG. 4 is a state diagram of machine 28).

Queues 22 and 23 each consist of a list of entries arranged in contiguous memory locations. Each is organized as a circular queue with processing of entries wrapping back to the top when the end of the list is reached. The device driver running on the processor establishes the location and number of entries in each of the queues by loading configuration registers 26 located in the I/O device at initialization time. Once configured the queues will remain static while the system is in operation.

Three configuration registers 26 are associated with each queue. For each queue one register holds the base address in main memory of the queue. A second holds a count of the number of entries or positions in the queue and a third defines the current position in the queue as it is processed. The seventh register contains a count which at all times indicates the number of data buffers 21 remaining to be processed.

Entries in the descriptor queue are created by the device driver software. Each descriptor entry typically includes:
1. a pointer (32 bits) to the physical address in main memory where the data buffer associated with that descriptor is located,
2. a byte count field (16 bits) which specifies the size of the associated data buffer, and
3. control information (up to 16 bits) to tell the I/O device how to handle the data transfer.

The data buffers defined by the descriptors in queue 22 can be either the source of data to be transmitted or the destination of data being received. In half duplex applications one set of queues 22 and 23 will suffice since only one function can take place at any given time. If full duplex operation is contemplated the queues 22 and 23 as well as the configuration registers 26 will have to be duplicated since both transmit and receive operations take place at the same time.

As data buffers are filled for transmission, the device driver software builds a descriptor for each buffer of data to be transmitted. These descriptors have the format described above. The driver then writes an "enqueue register" (DescrEnq register 26) on the I/O device. This write includes the number of descriptors built by the driver. The value is added by the I/O device to the current value of the DescrEnq register 26 (DER26) which indicates the number of descriptors (and buffers) ready for transmission.

When the DER26 has a non zero value, the data transfer machine 28 reads descriptors from the queue 22 starting at the DescrCurrent register 26 (DCuR26) value, which at initialization is equal to the DescrBase register 26 (DBR26). The DCuR26 and the DescrCount register 26 (DCoR26) enable the queues to operate as circular queues.

Each time a descriptor is read from the descriptor queue 22 register DCuR26 is incremented by one. A counter associated with register DCuR26 is also incremented by one each time a descriptor is read from the queue 22. Each time this counter is incremented the value is compared to the value stored in the DCoR26 register, if it is greater than the value stored a wrap is indicated and the value stored in the DBR26 register is entered in the DCuR26 register.

In those instances where more than one descriptor is to be fetched (a burst transfer) the number is added to the counter associated with the DCuR26 register and compared to the value stored in the DCoR26 register. If the value of the counter exceeds the value stored in the DCoR26 by more than one, the number of descriptor fetches must be reduced until the sum is equal to the value of the DCoR26 register plus one. On the access of the last descriptor the wrap completes as described above.

When the value of DER26 is greater than one, the state machine 28 can fetch a number of descriptors (up to the lesser of the value of the DER26 -register, the storage capacity of the descriptor pre-fetch queue 27 or the limitation imposed by the wrap constraint described above) in burst mode thus reducing substantially the number of system bus accesses. The descriptors are stored in the descriptor pre-fetch queue 27 and processed via DMA/Bus Master protocol.

As the descriptors are fetched and the buffers transmitted, both the DCuR26 and the DER26 registers are updated to reflect the transmission of the data buffers. If, during the process, the device driver has additional data buffers to transmit, it builds additional descriptors and sends that number to the I/O device where it is added to the current value of the DER26 register.

As the data transfer state machine 28 (DTSM28) empties the data buffers 21 it builds buffer status information in the status queue 23 indicating the transmission of the data stored in the buffers. The DTSM28 uses the StatusBase register 26 (SBR26), the Status Count register 26 (SCoR26) and the Status Current register 26 (SCuR26) in the same way as the corresponding descriptor registers are used to determine where to place the status information concerning each of the data buffers transmitted in the status queue 23.

The receive mode is substantially similar to the transmit mode described above. In receive mode, I however, the device driver loads the DER26 with the number of descriptors (buffers) available. The DBR26, DCoR26 and the DCuR26 registers are unchanged in operation. In receive mode the DTSM28 fetches descriptors from the descriptor queue 22 using the descriptor registers 26 as in the transmit mode and stores received data in the buffers indicated by the descriptors.

As the buffers are filled, the DTSM28 decrements the DER26 register and builds the status queue 23 using the status registers 26 in the same way it did in the transmit mode. The device driver checks the status queue and processes the received data in the buffers indicated in the status queue. As these buffers are emptied and become available to store additional data, the device driver sends the number of freed buffers across the system bus to the I/O device where the number is added to the current value of the DER26. Should the value of the DER26 fall to zero then an overrun error condition is indicated if received data must be transmitted to the data buffer.

The diagrams illustrated in FIGS. 3 and 4 are a convenient summary of the above detailed description and are self explanatory in view of that description.

We claim:
1. A controller for transferring data between a host system and external devices the host system having memory with data buffers, a descriptor queue and a receive status queue, the controller comprising:

a first register that maintains a number of descriptors that are currently available in the descriptor queue for use in a direct memory access (DMA) transfer;

a second register that maintains an address of the location of the first descriptor of the currently available descriptors in the descriptor queue;

a buffer for temporarily storing currently available descriptors that are obtained from the descriptor queue; and hardware circuitry that controls obtaining the currently available descriptors from the descriptor queue for temporary storage in the buffer, the circuitry retrieving as many currently available descriptors as possible to fill the buffer, based on the number in the first register and the address in the second register.

2. The controller of claim 1 wherein the hardware circuitry includes a state machine.

3. The controller of claim 2 wherein the state machine decrements the number of said first register by a value equal to the number of descriptors removed from said descriptor queue by the state machine.

4. The controller of claim 1 further including:

a status base register that holds a base address whereat a status queue is located in memory;

a status count register that holds a count representative of the number of entries in the status queue; and a status current register holding an address indicating a current position in said status register whereat processing is being done.

* * * * *